United States Patent [19]

Beswick

[11] Patent Number: 5,050,722

[45] Date of Patent: Sep. 24, 1991

[54] APPARATUS FOR ORIENTING ARTICLES

[75] Inventor: Frank Beswick, Phoenixville, Pa.

[73] Assignee: The West Company Incorporated, Phoenixville, Pa.

[21] Appl. No.: 488,680

[22] Filed: Mar. 2, 1990

Related U.S. Application Data

[62] Division of Ser. No. 391,088, Aug. 8, 1989.

[51] Int. Cl.[5] .............................................. B65G 47/24

[52] U.S. Cl. .................................................... 198/392

[58] Field of Search ......................... 198/392; 221/160

[56] References Cited

U.S. PATENT DOCUMENTS 3,165,194 1/1965 Madden ............................... 198/392
3,578,140 5/1971 Myer et al. .......................... 198/392
3,735,859 5/1973 Miller ................................. 198/392
3,815,782 6/1974 Miller ................................. 198/392
4,266,653 5/1981 Mergl ................................. 198/392
4,610,345 9/1986 Spreen et al. ....................... 198/392
4,709,798 12/1987 Herzog ............................... 198/392
4,830,172 5/1989 Hilton et al. ........................ 198/392
4,848,559 7/1989 Hoppman et al. .................. 198/392

*Primary Examiner*—Joseph E. Valenza
*Attorney, Agent, or Firm*—Eugene E. Renz, Jr.

[57] ABSTRACT

Orienting apparatus for orienting articles such as stoppers in a predtermined fashion so that they can be assembled to vials comprising a central rotatable dome member, defining an open chamber for the stoppers where they are positioned in random fashion and a plurality of track-ways communicating with the rotatable dome element and a discharge station and deflector means along the track-ways cooperatively associated therewith which, upon rotation of the dome element, cause the element along said track-ways and during course of movement to become oriented in a predetermined position when they are at the said discharge station.

3 Claims, 10 Drawing Sheets

FIG.8
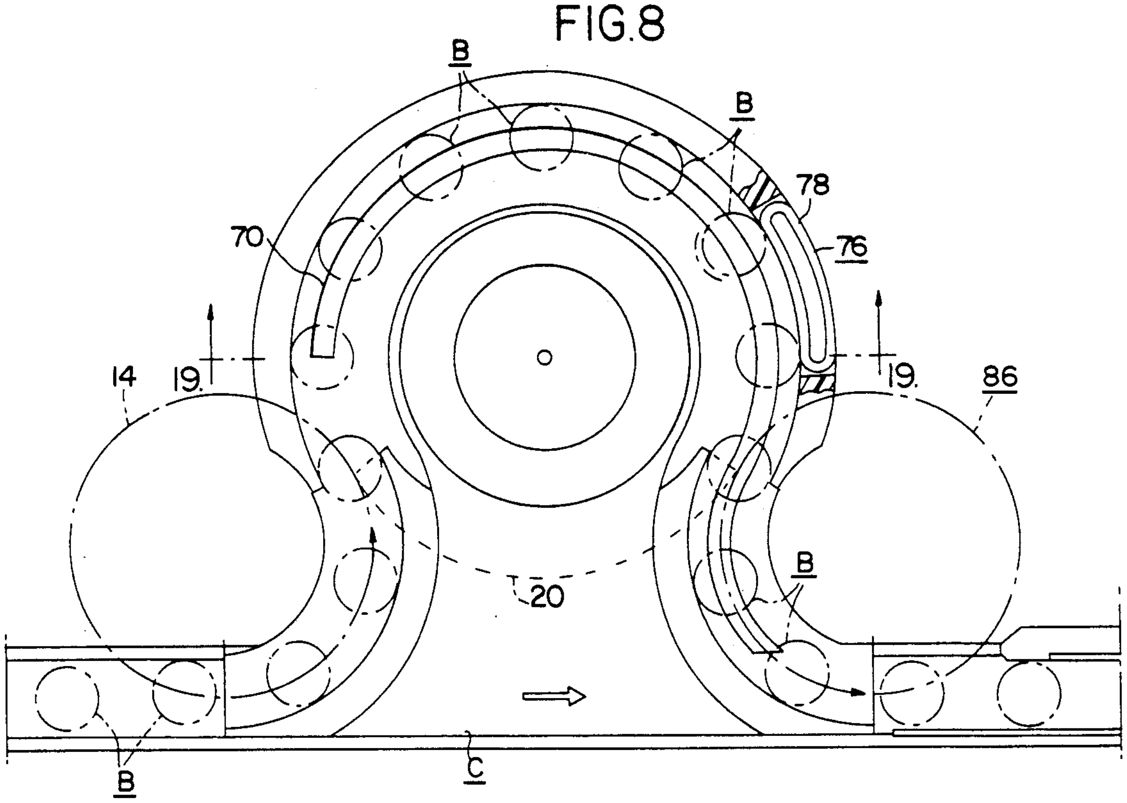
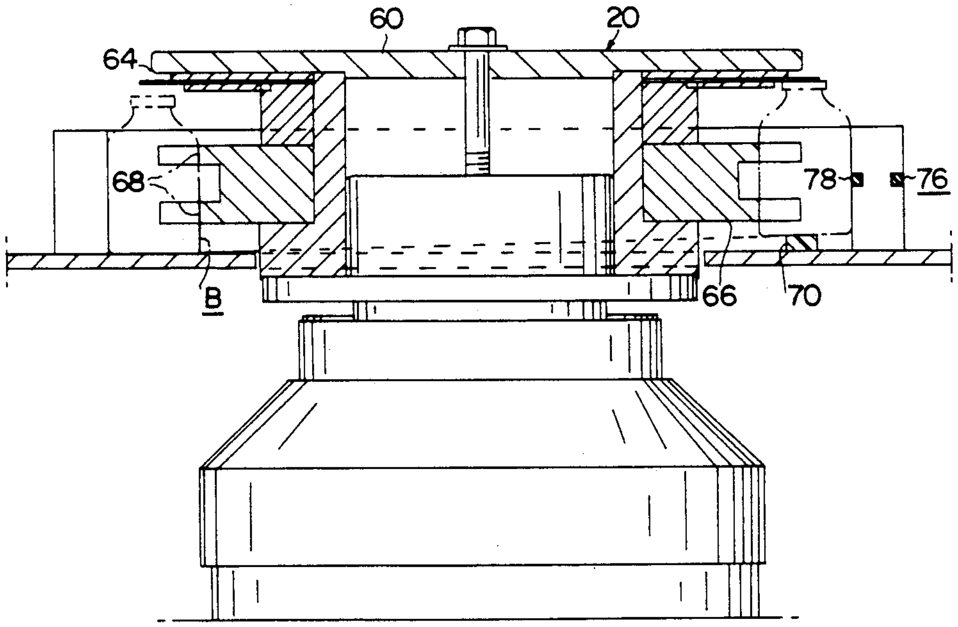
FIG.9

FIG. 11
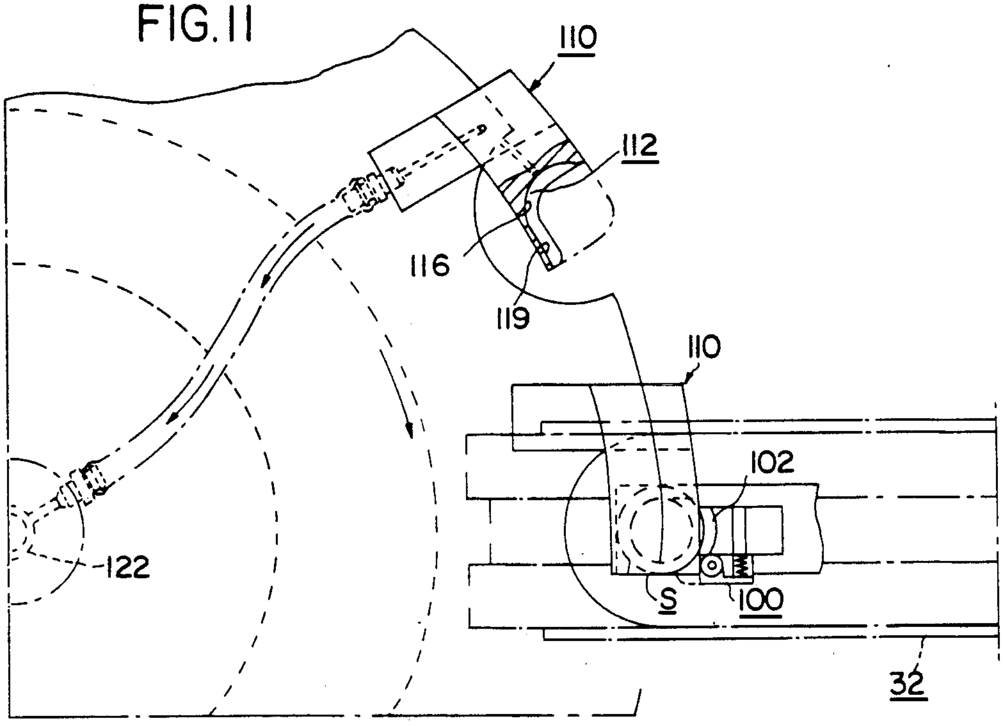
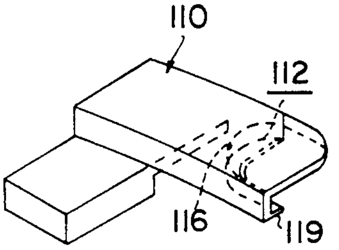
FIG. 12
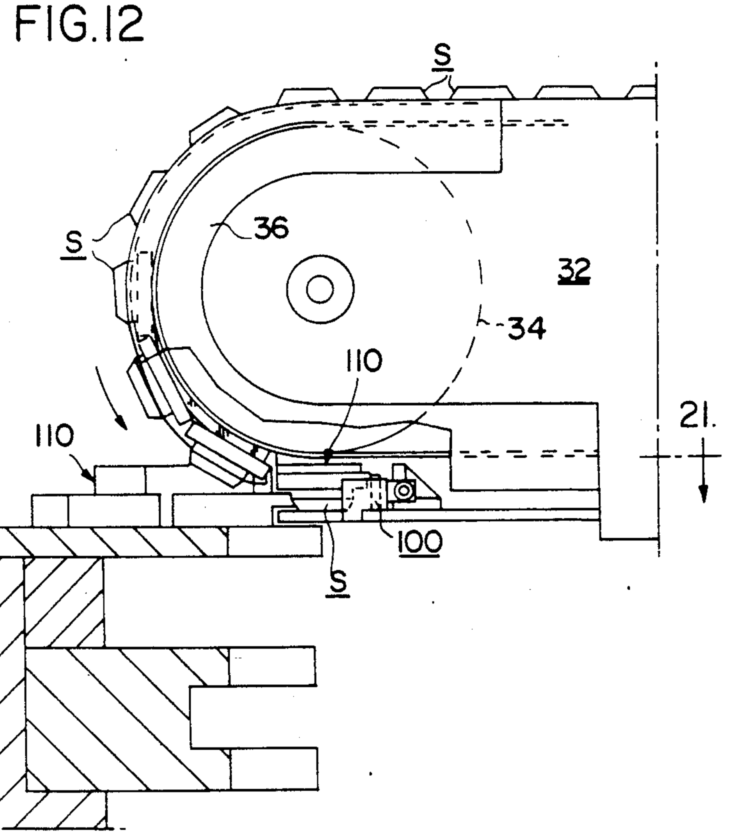
FIG. 10

APPARATUS FOR ORIENTING ARTICLES

This is a divisional of copending application Ser. No. 07/391,088 filed on Aug. 8, 1989.

FIELD OF THE INVENTION

The present invention relates to method and apparatus for automatically assembling stoppers to vials for pharmaceutical products or the like.

BACKGROUND OF THE INVENTION

Some pharmaceutical products such as injectables are typically packaged in glass vials and maintained in a sterile condition by means of a closure assembly applied to the container under aseptic conditions. The closure typically comprises a rubber stopper of generally t-shaped cross section which has a depending plug portion engaging in the neck of the bottle and a flange which rests and engages the outer end face of the bottle finish. An aluminum seal or over wrap normally seals and seats the rubber stopper firmly in place in the discharge end of the bottle. One form of seal is of the type shown in The West Patent No. 3,071,274 which is sold under West trademark FLIP OFF. This seal comprises an aluminum cap portion which crimps under the container finish having a removable central disk portion and a cover element made of plastic connected to the disk portion which may be actuated to separate the central removable disk portion and expose the stopper so that a hypodermic syringe can be applied to remove the pharmaceutical product. These containers and closures are usually filled and sealed by automatic handling equipment comprising a plurality of stations including a filling station, a stopper application station and a closure assembly station all connected by conveyor means. Typically the bottles are stopper intermittently at the stopper application station for insertion of the stopper. It has been found that this process is somewhat time consuming and limits the production rate of filling and sealing pharmaceuticals.

SUMMARY OF THE INVENTION

With the foregoing in mind, it is an object of the present invention to provide an improved apparatus and system for processing vials of the above type whereby vials can be filled, stoppered and sealed in a continuous uninterrupted manner and thereby increase the productivity of processing vials considerably. Furthermore, the apparatus and system of the present invention are characterized by novel features of construction and arrangement minimizing creation of particulate matter in handling and assembly of the stoppers and thereby eliminating this as an objection and hazard in the vial filling and handling operation.

Considering the broad details and operation of the stoppering system of the present invention, filled vials are delivered by suitable conveyor means in a continuous stream along a predetermined path through a stoppering station including a continuously rotating stopper transfer workwheel having a plurality of circumferentially spaced bottle supporting pockets about its periphery. Stoppers are delivered in a continuous row or line to a position adjacent the periphery of the pickup or workwheel. Each bottle pocket on the workwheel has an associated stopper pickup element disposed above each of the workwheel pockets. As the workwheel rotates each pick up element captures a stopper from the stopper supply line positioned so that the plug portion of the stopper is aligned vertically with the discharge opening in the neck of the bottle. Then as the workwheel is rotated, the bottle is gradually elevated to engage the stopper in the discharge opening during the course of rotary movement of the workwheel to a predetermined discharge location at the discharge end of the path. A tamping mechanism engages each stopper as it discharges the workwheel to ensure complete assembly of the stopper in the mouth of the bottle. Additionally, adjacent the terminal portion of the stopper applying cycle means is provided for rotating the container relative to the stopper to provide a threading action and ensure good final assembly and seating of the stopper in the bottle neck. This action also permits venting of pressure in the head space so that when the bottle is discharged down stream for application of the closure, the internal pressure is such that it does not displace the stopper and pop it outwardly.

Considering some of the element of the system more specifically, the stoppers are accumulated in a random fashion in an orientor feeder of conventional construction having a rotary conical internal member which delivers stoppers face down one at a time to an exit trackway. The exit trackway aligns with a small belt conveyor which delivers the stoppers in abutting end to end array to a stopper delivery station adjacent the pick-off or workwheel. An interesting feature of the machine is that from the exit ramp of the stopper feeder to the transfer wheel adjacent the workwheel, there is a predetermined controlled delivery force applied to the column or line of stoppers in that region. By this arrangement creation of unwanted particulate matter in the handling of the stoppers from the hopper to its application on a bottle is practically eliminated. The theory is based on the principle of minimizing the force between the stopper and any of the moving parts and thus, reduce friction and thereby reduce creation of particulate matter.

At the discharge end of the main stopper delivery conveyor, there is a rotary transfer disk and an inverted confined trackway of u-shaped configuration overlying a portion of the periphery of the disk. The trackway delivers the stoppers to the periphery of the workwheel. The upper portion of the arcuate trackway mounts a plurality of roller which are designed to maintain the face of the stopper in contact with the transfer wheel and balance the forces so that the force required to deliver the stoppers to the delivery point in a minimum. Hence the friction is the lowest.

The workwheel comprises an upper plate member having a series of circumferentially equi-spaced pockets that during rotation of the wheel, capture filled bottles one at a time in the pockets and move them along a circular path. The workwheel also includes a bottle advancing starwheel having a series of pockets which are aligned with the stopper pockets and advance the bottle one at a time into each station. The stopper pick up finger is associated with each bottle pocket. The workwheel mechanism further includes an arcuate ramp on which the bottles are supported during movement in the circular path of the workwheel. The ramp is inclined upwardly around to a point approximately 180° from the inlet point and during traversing this portion of the ramp, the bottle is raised vertically into the stopper at about 180° out the stopper is almost fully inserted. From there to the discharge end of the cycle, the ramp is essentially level to the discharge point. The discharge ramp in the present instance comprises a number of segments which are spring biased as a safety precaution to allow for tolerance variations in the height of the bottle. Adjacent this portion of the cycle, there is a traction belt in the form of an O-ring mounted on a rail circumscribing the workwheel and defining a confined path for the bottles. Bottles engage the traction belt and rotates during part of the cycle. Rotation of the bottles has the effect of relieving internal pressure, by a screwing action and by a relative rotation between the stopper and the bottle. This relative rotation action provides a vent path to vent the bottle, to release any pressure buildup in the head space above the liquid during the stopper application cycle. This minimizes the chance of popping a stopper when it is discharged from the workwheel.

Bottles filled at a station up stream of the stoppering station are delivered to the infeed starwheel by a conventional screw mechanism which spaces the bottles a predetermined distance relative to one another to engage in the pockets of the infeed starwheel. A discharge starwheel of a similar configuration receives the stoppered bottles in its periphery and delivers them through a discharge station. Two arcuate guides cooperate with the infeed and the discharge starwheel to ensure positive feeding of the bottles in the desired path.

At the discharge station, a hold down mechanism engages the upper face of each stopper at the point of discharge of the bottle from the workwheel to the discharge starwheel. The hold down mechanism is in the form of a rotary wheel which has easy adjustability so the operator can position it in the optimum place for seating the stopper during the discharge operation.

An important feature of the system is that the stopper plug in all of its phases is not being driven or engaging elements which again, eliminates the risk of producing particulate in the important area of the stopper, that is, the portion that projects into the vial and could contaminate the contents. The stations on the workwheel can be increased up to 36 and run at the same peripheral speed to produce a capacity of in excess of stoppering a thousand bottles a minute.

BRIEF DESCRIPTION OF THE DRAWINGS

These and other objects of the present invention and the various features and details of the operation and construction thereof are hereinafter more fully set forth with reference to the accompanying drawings, where.

Figure 3:
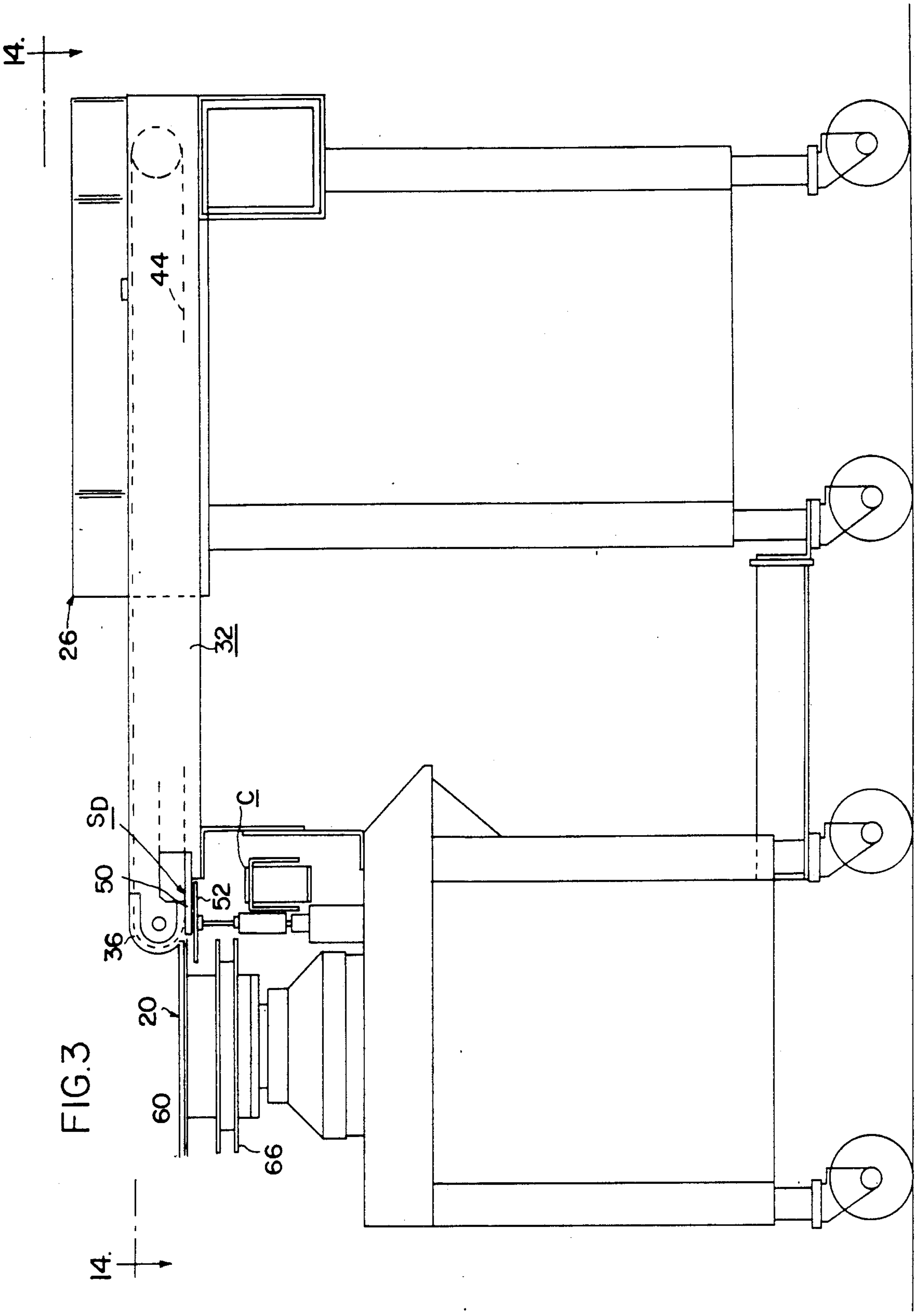
Figures 4, 5:
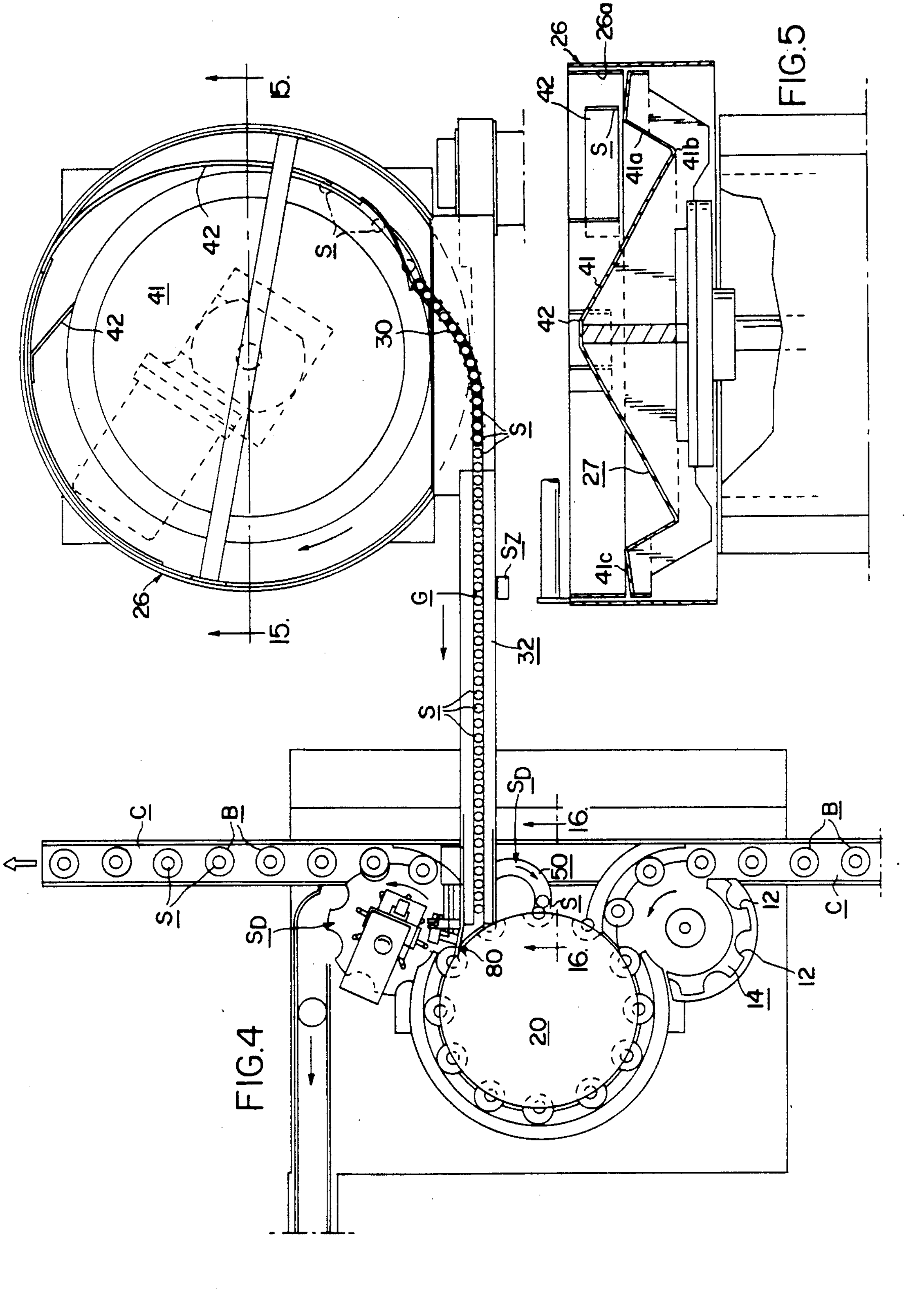
Figure 7:
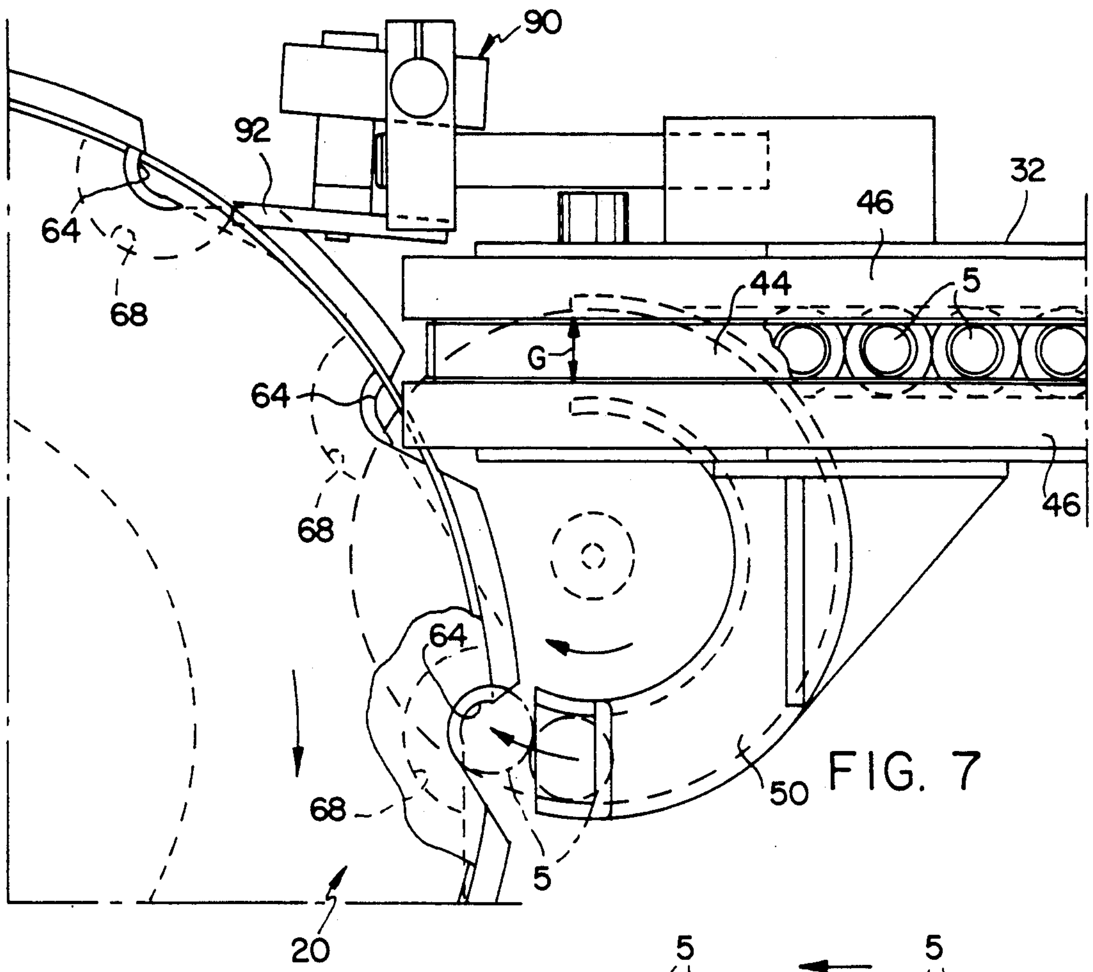
Figure 6:
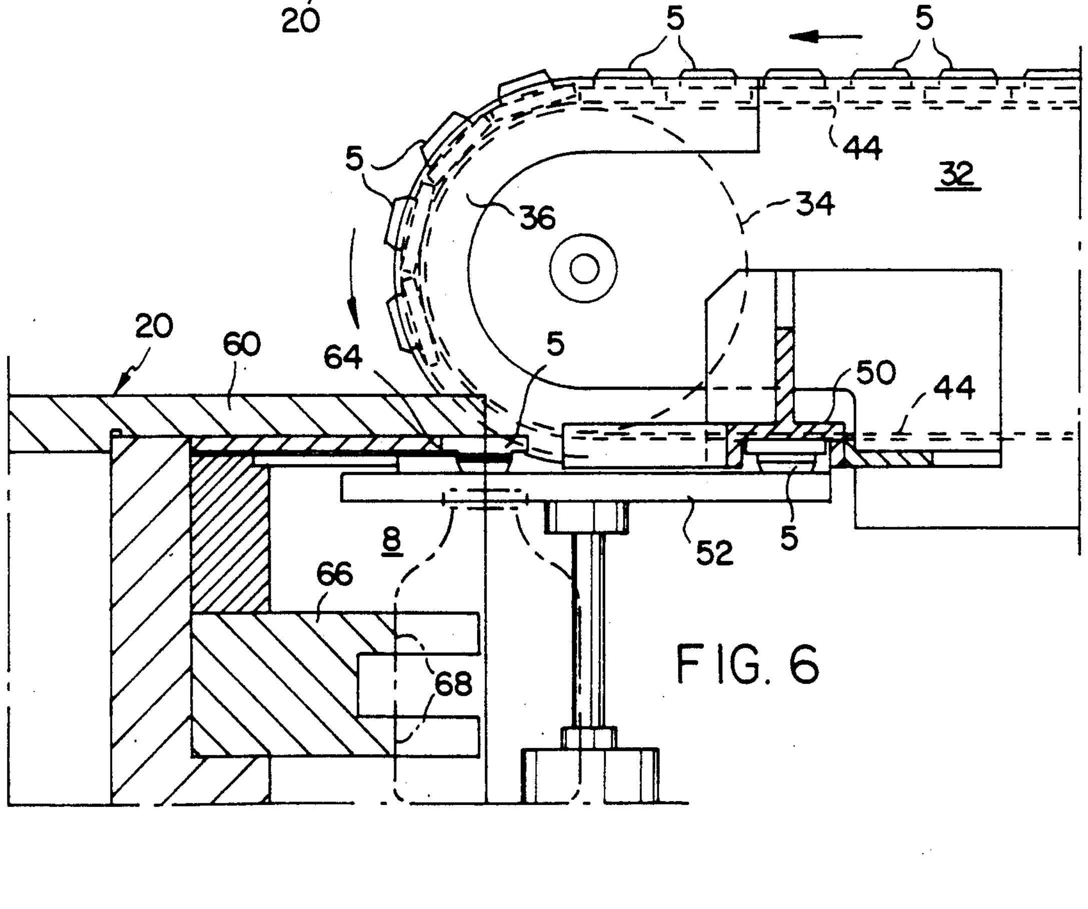
Figure 13:
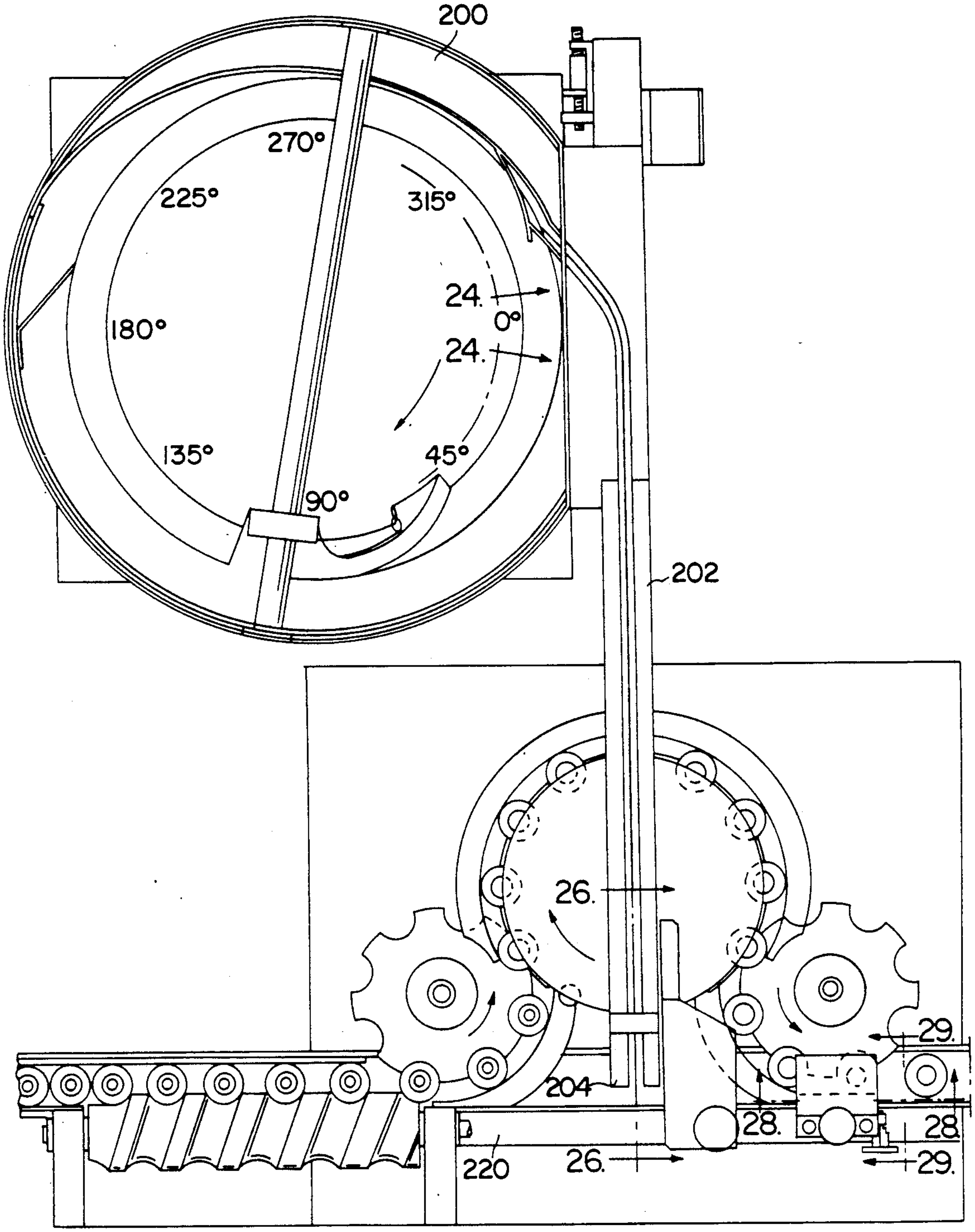
Figure 14:
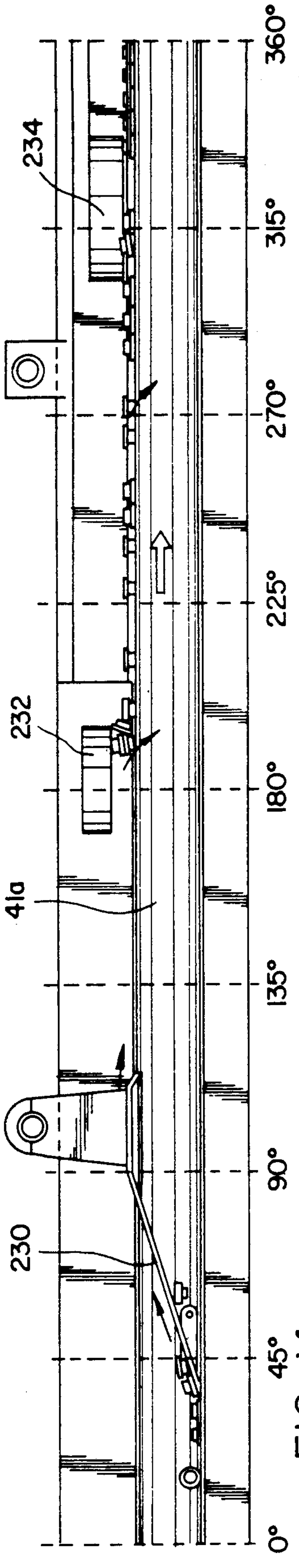
Figure 15:
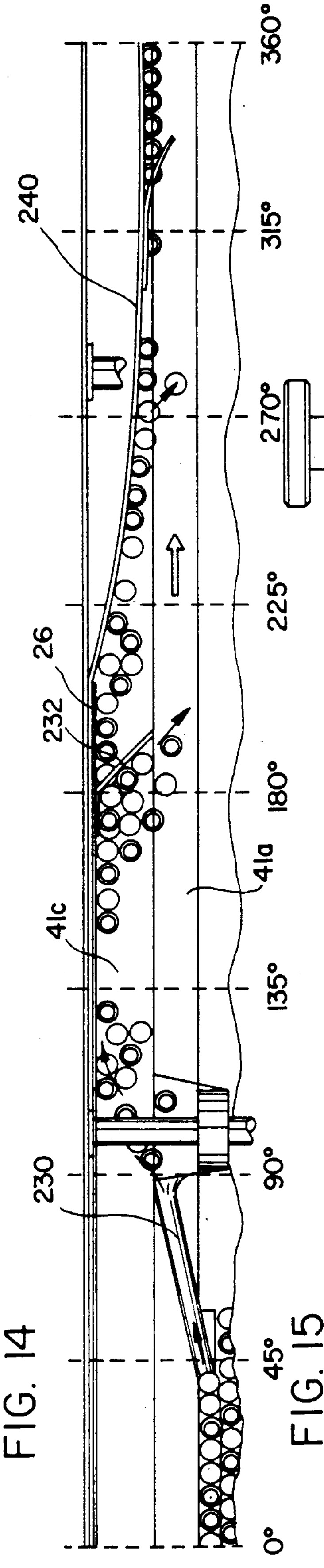
Figure 19:
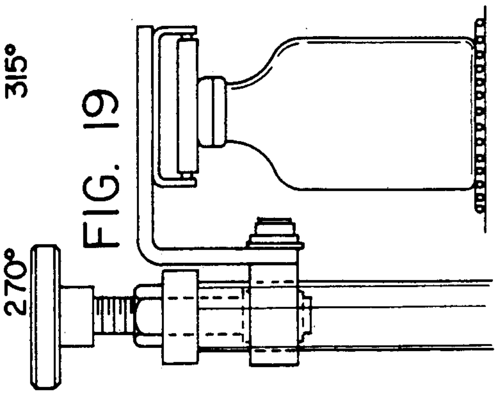
Figure 18:
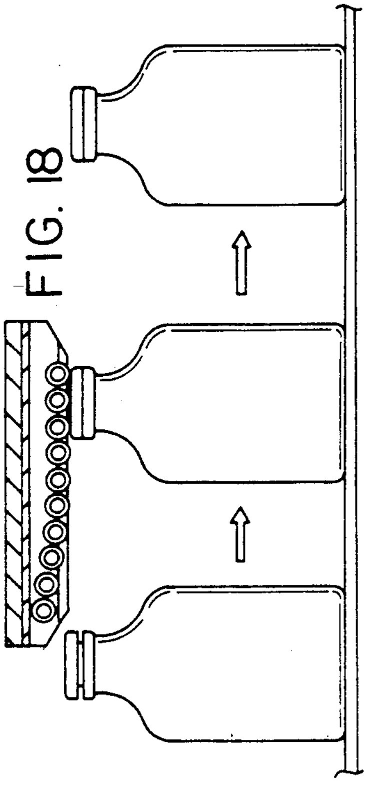
Figure 17:
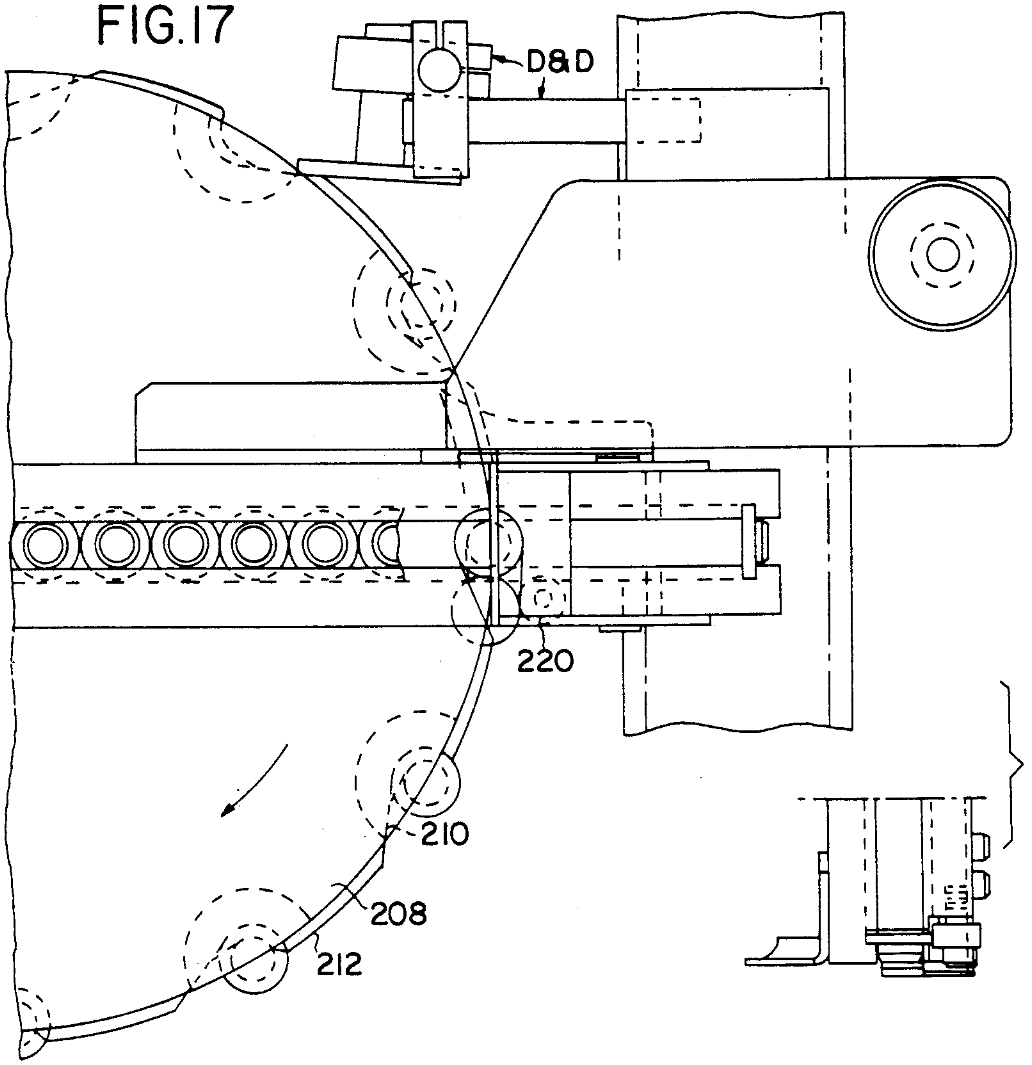
Figure 16:
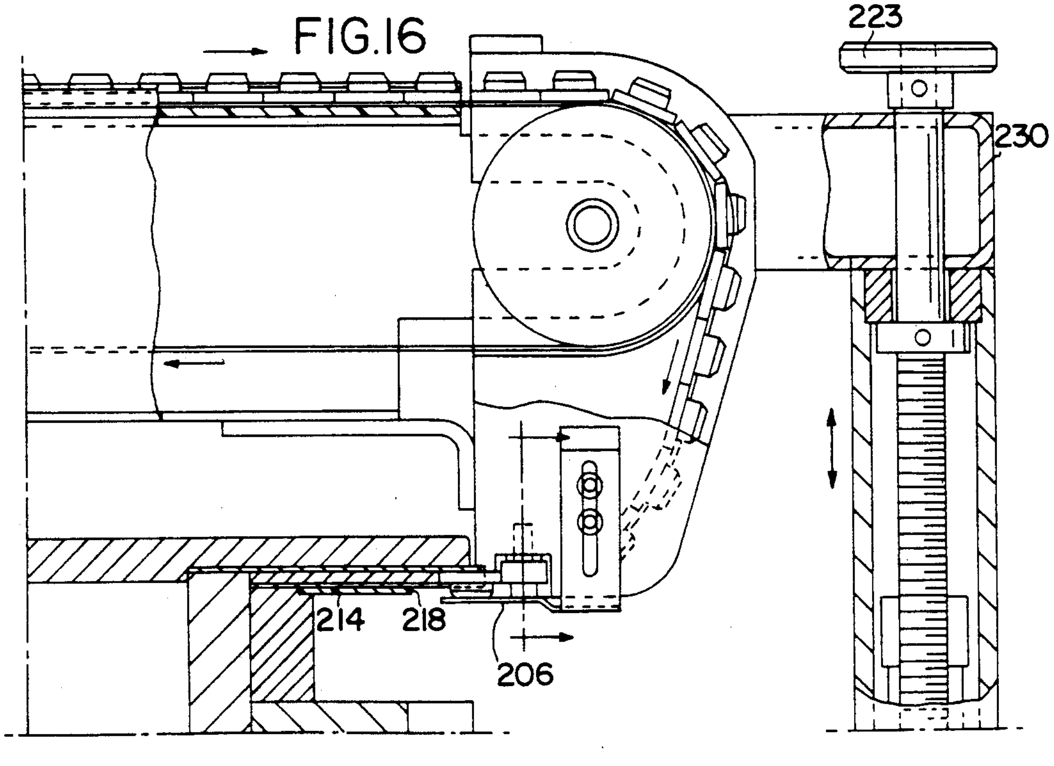
Figure 21:
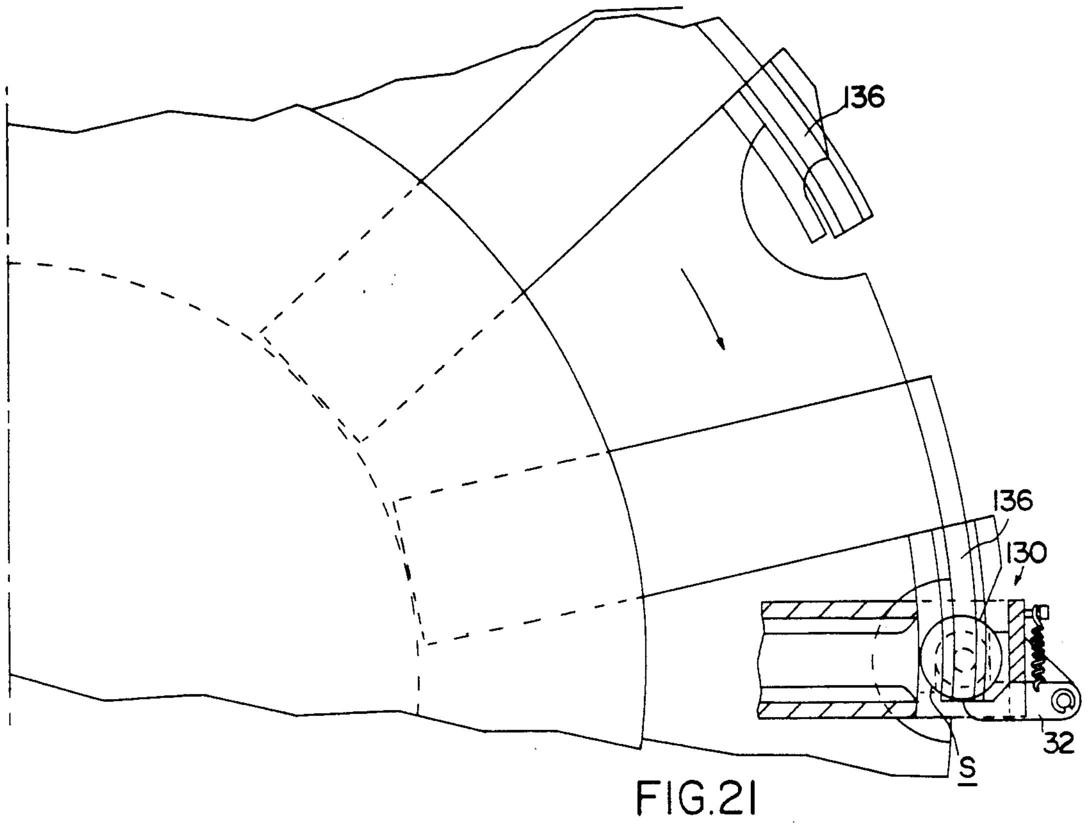
Figure 22:
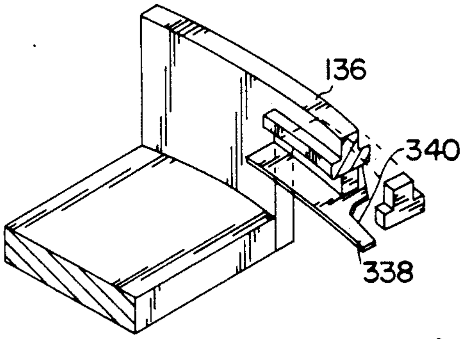
Figure 20:
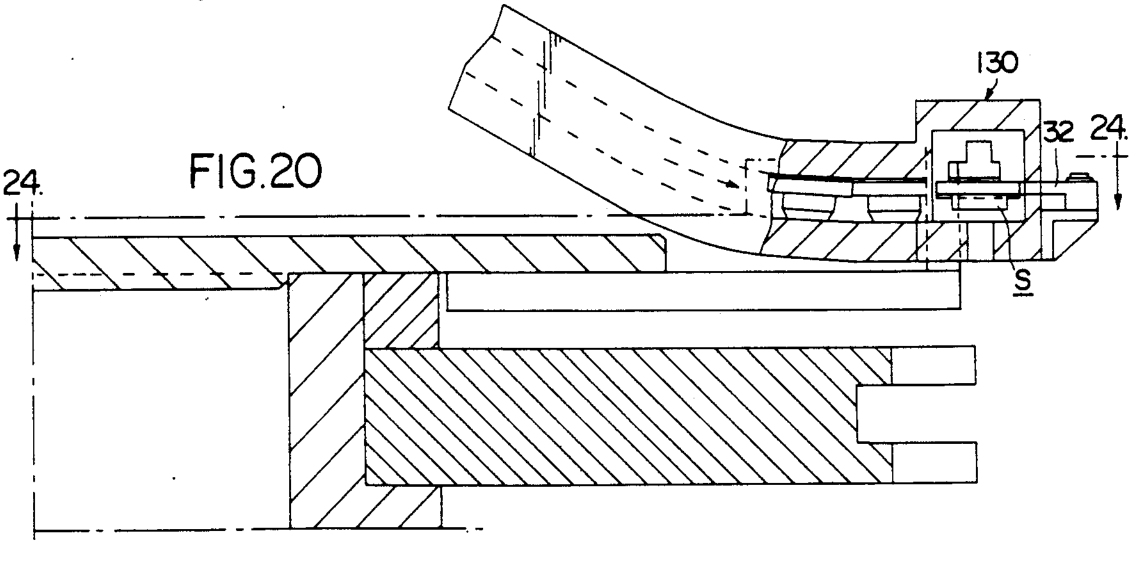

FIGS. *2a–2e* inclusive are views illustrating the method at various points along the continuous operation for applying the stopper to a bottle;

FIG. 3 is a side elevational view of the stopper applying mechanism in accordance with the present invention;

FIG. 4 is a top plan view showing the stopper application part of the system;

FIG. 5 is an enlarged sectional view taken on lines 15—15 of FIG. 4 through the stopper supply hopper;

FIG. 6 is a transverse sectional view taken on lines 16—16 showing the stoppers being delivered in line to the transfer wheel;

FIG. 7 is an enlarged fragmentary view as viewed from lines 17—17 of FIG. 4;

FIG. 8 is a plan view showing the path of travel of the containers and bottles through the stopper application machine;

FIG. 9 is an enlarged sectional view taken on lines 19—19 of FIG. 8;

FIG. 10 is a side elevational view partly in section of a modified form of stopper applying mechanism in accordance with the present invention;

FIG. 11 is a plan view taken on lines 21—21 of FIG. 10;

FIG. 12 is a perspective view of the stopper pick off finger;

FIG. 13 is a side elevational view partly in section of a modified form of stopper applying mechanism in accordance with the present invention;

FIG. 14 is a developed side elevational view of a portion of the stopper hopper assembly shown in the upper left portion of FIG. 13;

FIG. 15 is a developed top plan view similar to FIG. 14;

FIG. 16 is an enlarged fragmentary sectional view taken on lines 26—26 of FIG. 13;

FIG. 17 is a fragmentary top plan view showing the stopper pick off station;

FIGS. 18 and 19 are enlarged views taken on lines 28—28 and 29—29 respectively of FIG. 13;

FIG. 20 is an enlarged sectional view of a modified version of the stopper pick off station;

FIG. 21 is an enlarged fragmentary plan view showing the modified assembly; and FIG. 22 is an enlarged fragmentary perspective view of a pick off finger.

DETAILED DESCRIPTION OF THE PREFERRED EMBODIMENT

As noted above, the system and method of the present invention have particular application and use in filling vials or bottles B with a pharmaceutical product. These bottles B are typical and as illustrated in FIGS. *2a–2e* inclusive and FIG. *3a* have a reduced neck finish to accept a stopper S of generally t-shaped cross section.

Figures 1, 2A, 2B, 2C, 2D, 2E:
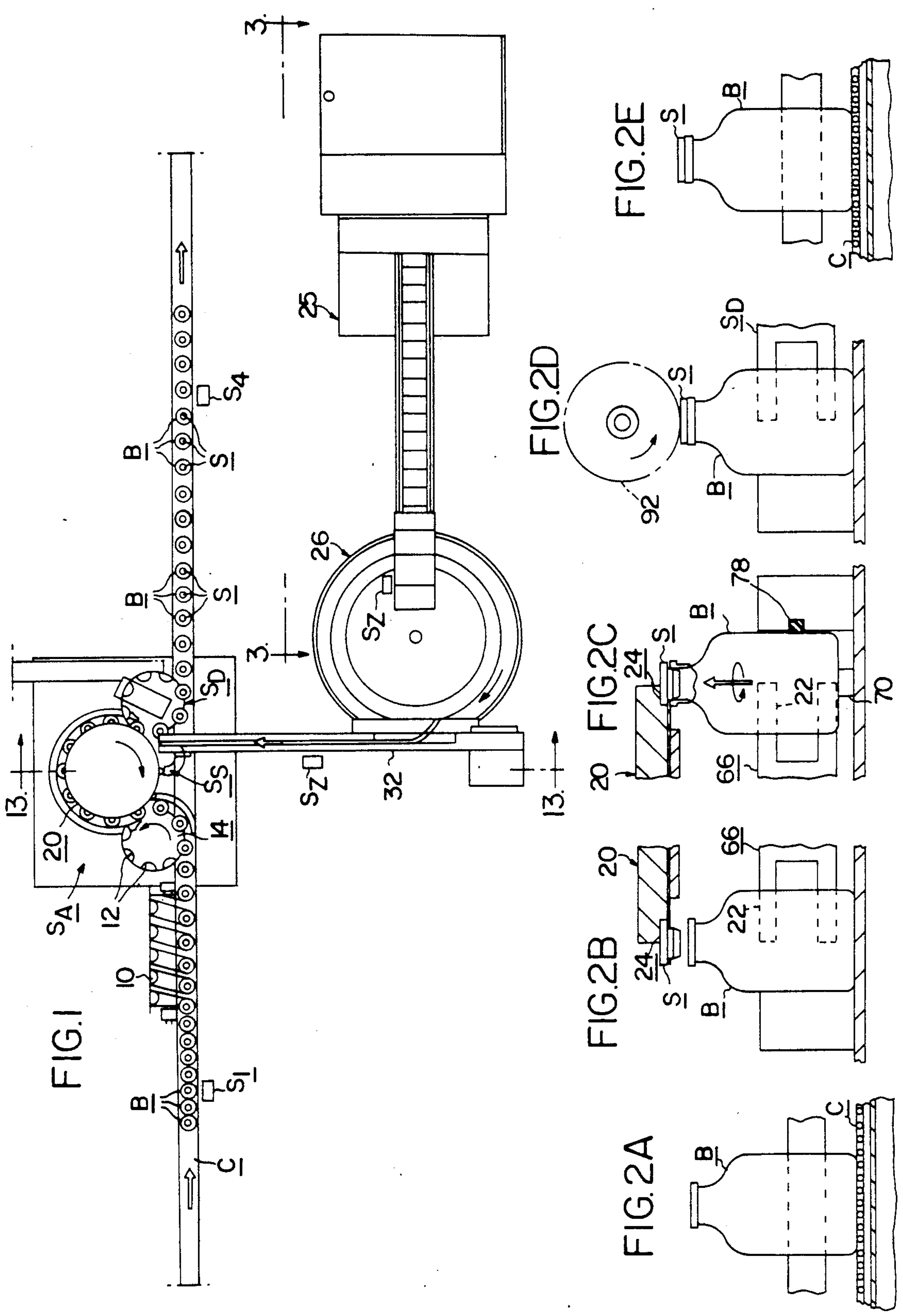
FIG. 1 is a schematic plan view showing the stopper system and method of the present invention.

Considering the system for applying the stoppers S in terms of function and with particular reference to FIG. 1, bottles B are delivered to a stopper applying station $S_A$ in abutting side by side array by an inlet conveyor C where they engage a screw feed mechanism 10 which spaces the incoming bottles so they engage in pockets 12 of an infeed starwheel 14. The bottles are filled by high-speed automatic filling equipment down stream of the inlet conveyor C. A sensor $S_1$ may be provided in the line to ensure that only filled bottles are processed further. As illustrated, the bottles B are presented in predetermined space relation from the infeed starwheel 14 to a stopper workwheel 20 which is also in the nature of a starwheel in that it has a plurality of bottle receiving pockets 22 equi-spaced circumferentially. Each bottle pocket 22 on the workwheel has an associated stopper pickup mechanism 24.

Considering operation of the system briefly, filled bottles B are delivered continuously to fill each pocket of the rotating workwheel H. Simultaneously, the last stopper S in line which normally presses against the workwheel periphery is plucked by a pick up finger during rotation of the workwheel to overlie and be applied to an underlying filled bottle B as it traverses the arcuate path from the stopper station $S_S$ to the discharge station $S_D$. Assembly results from relative axial and rotational movement of each stopper S and bottle B during continuous movement through the apparatus as explained in more detail below.

Considering the various elements and stations in more specific detail and turning first to the system and apparatus for conveying the stoppers S to the stopper assembly station $S_A$, an elevator and delivery system of the type shown in FIGS. 1-11 inclusive broadly referenced by the numeral 25 may be utilized to deliver stoppers on a continuing basis to the stopper orientor 26. The details of this conveyor are the subject of a pending application Ser. No. 07/076,777, U.S. Pat. No. 4,856,640, entitled STOPPER ELEVATOR CONVEYOR, filed July 7, 1987, owned by the Assignee of the present application and are incorporated by reference herein. Stoppers S are accumulated in a random fashion in an orientor/-feeder 26 having a rotary conical member 27 operable to deliver stoppers S face down one at a time to an exit trackway 30. The exit trackway 30 aligns with a small belt conveyor 32 which delivers the stoppers S in a row end to end to a stopper delivery station $S_D$ adjacent the pick-off or workwheel 20. An interesting feature of the system is that from the exit ramp of the stopper feeder to the transfer wheel adjacent the workwheel, there is a predetermined controlled delivery force applied to the column or line of stoppers in that region. An important function of the entire system is to minimize creation of particulate matter in the handling of the stoppers from the hopper to its application on a bottle. The theory is based on the principle of minimizing the force between the stopper and any of the moving parts and thus, reduce friction and thereby reduce creation of particulate matter. The orientor 26 as best illustrated in FIG. 5 includes a central rotatable dome element 41 and various trackways 42 so that when stoppers are placed in the central portion and the dome rotates, they are directed in a predetermined oriented array, that is, top face down to the exit, or discharge ramp of the oriented. From here the stoppers are delivered to a conveyor mechanism 32 comprising an endless belt 44 and two rails 46 spaced above the belt and spaced apart to define a gap G of a width through which the plug portion of the stopper S projects. In this fashion, the stoppers are aligned and retained on the conveyor in a row in end to end fashion. A sensor $S_2$ provided along the length of the conveyor senses stoppers in the trackway and is operatively associated with the rest of the system so that to a signal demand for stoppers in the orientor when the supply is exhausted. This ensures continuous high-speed operation. As best illustrated in FIGS. 6 and 7, a horse shoe shaped channel member 50 is disposed adjacent the lower run of the stopper conveyor 32 which overlies a continuously rotating transfer wheel 52. By this arrangement stoppers are stripped from the main conveyor and diverted through the horse shaped channel to a point adjacent the periphery of the pickoff or workwheel in the manner described in more detail below. The channel 50 has a series of rollers 54 which bear lightly against the top face of the stopper to ensure good movement of the stoppers through the system and minimize abrasive contracts which could generate particulate matter.

The transfer wheel 52 rotates in a direction to rotate the outermost stopper in the column adjacent the pickup wheel to a point where it is aligned with and normally engages the outer peripheral surface of the wheel or rail between the circumferentially spaced pickup pockets on the workwheel 20. (SEE FIG. 7).

At the discharge end of the stopper delivery conveyor 32 there is a conveyor belt sheave 34. Overlying a portion of the periphery of the conveyor belt sheave 34 is an inverted confined trackway 36 of U-shaped configuration. The trackway 36 guides the stoppers to the periphery of the workwheel 52. The upper portion of the arcuate trackway 36 mounts a plurality of rollers 38 which are designed to maintain the face of the stopper in contact with the conveyor belt of on the wheel 34 and balance the forces so that the force required to drive the stoppers to the delivery point in a minimum. Hence the friction is the lowest.

The workwheel 20 comprises an upper plate member 60 having a series of circumferentially equi-spaced pick up fingers 64 which during rotation of the wheel, capture stoppers one at a time and move them along a predetermined arcuate path. The workwheel also includes a bottle advancing starwheel 66 having a series of pockets 68 which are aligned with the stopper pockets and advance the bottle one at a time into each station. The workwheel mechanism further includes an arcuate ramp 70 on which the bottles are supported during movement in the circular path of the workwheel. The ramp 70 is inclined upwardly around to a point approximately 180° from the inlet point in the workwheel cycle. During traversing this portion of the ramp, the bottle is raised vertically into the stopper and at about 180° out the stopper S is almost fully inserted. From there to the discharge end of the cycle, the ramp returns to the level at the conveyor belt C. The discharge ramp 72 in the present instance comprises a number of segments 74 which are spring biased as a safety precaution to allow for tolerance variations in the height of the bottle. Adjacent this cycle of the operation, there is a traction belt 76 in the nature of an O-ring 78 against which the bottles engage and rotate during this latter part of the cycle. Rotation of the bottles relieves internal pressure, by a screwing action which is desirable to relieve any pressure buildup in the head space above the liquid during the stopper application cycle. This minimizes the chance of popping a stopper when it is discharged from the workwheel.

Bottles filled at a station upstream of the stoppering station are delivered to the infeed starwheel 14 by a conventional screw mechanism 10 which spaces the bottles B a predetermined distance relative to one another to engage in the pockets 12 of the infeed starwheel 14. The discharge starwheel 86 is a similar configuration and received the stoppered bottles in its periphery and delivers them to a discharge station $S_D$. Two arcuate guides 88 and 90 cooperate with the infeed and the discharge starwheels to ensure positive feeding of the bottles in the desired path.

A hold down mechanism 90 at the discharge station engages the upper face of each stopper at the point of discharge of the bottle from the workwheel 20 to the discharge starwheel 86. The hold down mechanism 90 is in the form of a rotary wheel 92 which has easy adjustability so the operator can position it in the optimum place for seating the stopper during the discharge operation.

Considering now operation of the apparatus described above. The cycle of operation is very simple. The operators simply turns the power on which automatically initiates the various mechanisms for feeding stoppers and bottle to be assembled. In other words, filled bottles are moved in a spaced relation by the feed screw blank to the infeed starwheel to be presented to the workwheel pockets one at a time in a continuous fashion. Simultaneously, stoppers delivered from the stopper accumulator station move to the periphery of the workwheel in a continuous fashion and upon rotation of the workwheel assembled to the filled bottles in the manner described above. Movement of bottles and stoppers to and through the workwheel in this fashion commences and continues automatically. There are a number of sensors strategically located to sense stopper and bottle supply an effect shutdown of the apparatus under certain conditions. For example, the sensor blank adjacent the exit trackway for the stoppers will effect shutdown of the entire unit when the continuous flow of stoppers has been interrupted. Likewise, the sensor $S_1$ at the infeed starwheel senses the absence of filled bottles and shuts the system down. The workwheel assembly is adjustable vertically as a unit to provide a means for adjusting the same vertically and thereby the system can accommodate bottles of various sizes and heights. This also permits fine tuning of the apparatus to ensure the proper relative position of the stoppers and bottles particularly in the initial stages of the cycle as at blank. Furthermore, the inlet conveyor has a degree of adjustability to allow positioning of the transfer wheel accurately relative to the workwheel.

There is illustrated in FIGS. 21 and 22 a modified form of stopper assembly system and apparatus in accordance with the present invention. The overall system is similar to that described above except that in the present instance the transfer wheel associated with the stopper conveyor is eliminated and instead the stoppers are delivered to a transfer station adjacent the periphery of the workwheel directly from the lower run of the transfer conveyor as shown in FIG. 10.

The transfer station includes a spring biased pivotal stop member 100 and an arcuate abutment ledge 102 which positions the last stopper in the line on the conveyor in a predetermined position relative to the periphery of the pickup wheel so it can be properly engaged during rotation of the pickup wheel in the manner indicated. The pickup fingers as best illustrated in FIGS. 11 and 12 is generally designated by the numeral 110 and includes a pocket 112 having an elongated side ledge 119 which engages under a portion of the top of the stopper and an arcuate rear section 116 which likewise is sized to engage under the top of the stopper when the pickup finger 110 rotates to a position where it is aligned with the last most stopper in the line as illustrated in FIG. 11. The pocket traverses an arcuate path and the transfer seat 102 is aligned on that arcuate path so that as the finger passes the stopper position therein the finger engages the stopper and carries the stopper. At this point, the stopper overlies and is spaced axially above a filled bottle. As the wheel continues to rotates, the bottle B is moved axially upwardly to affect engagement of the stopper and the discharge opening in the manner described previously. Note that the pickup wheel 20 has a central manifold 122 connected to a suitable air source to apply a vacuum to the seat 112 in the pickup finger to assist in retaining the stopper on the finger as it passes through the pickup station. Note that the spring biased retaining finger pivots outwardly to release the stopper when the pickup finger moves through the pickup station.

There is illustrated in FIGS. 13-19 inclusive a modified embodiment of the apparatus and method for assembling and applying stoppers and closures to filled vials. In accordance with this embodiment, the hopper 200 for the vials is located closely adjacent the turntable incorporating the mechanism for assembling the stoppers S to the filled bottles B. In this instance, the stoppers S move on to an elongated linear conveyor 201. The upper run 202 of the conveyor overlies the rotary turntable 20 and terminates in an arcuate downwardly extending exit ramp 204 to deliver the stoppers to a pick off station 206 (SEE FIG. 16). The pick off wheel 208 as best illustrated in FIG. 17 has a series of circumferentially equi-spaced pockets 210 in its outer periphery of generally the same configuration as in the previously described embodiment. The pockets 210 extend inwardly from the outer arcuate peripheral surface 212 of the wheel which is interrupted by the pockets 210 in the manner shown in FIG. 17. The pick off wheel 208 as illustrated has a lower plate member 214 having peripheral arcuate edge 212 of the wheel and spaced slightly radially inwardly therefrom as best shown in FIG. 17. These elements form the pocket within which the flange of the stoppers nest as the wheel traverses the pick off station. Stoppers moved in a continuous in line fashion to the pick off station ride on the arcuate edge 216 until a pocket 210 is aligned with the row of stoppers S at the pick off station. As a stopper is picked up by the rotating wheel 208 at the pick off station, the stopper picked as the wheel rotates in the direction of the arrow engages a snubber wheel 220 to ensure retention of the stopper just picked up at the pick off station in its respective pocket. The snubber wheel 220 as best illustrated in FIG. 17 is freely rotating and as illustrated has a portion 211 of its outer peripheral edge overlapping the outer peripheral trace of the stopper flange $F_S$ to gently press the stopper in the seat. This action as best illustrated in the fragmentary view of FIG. 17.

Another feature of this embodiment on the invention resides in means for adjusting the stopper conveyor 201 relative to the pick off wheel. This relationship is rather critical and must be precise in order to ensure proper positioning of the stoppers at the pick off station for easy and free delivery by the pick up wheel to the next assembly operation. To this end, the adjusting mechanism broadly designated by the numeral 222 comprises a screw mechanism 224 supported on the frame of the transfer mechanism as frame 226 of the conveyor mechanism (SEE FIG. 13). As illustrated the elongated stopper conveyor has an arm extension 231 normally sits on the adjusting screw mechanism so that turning of the screw adjusts the conveyor vertically relative to the pick off wheel. In this manner the precise discharge location of the stopper at the pickup station may be vernally calibrated.

At the discharge end of the stopper conveyor there is a bracket 240 having an arm extension 242 defining the seat against which the stoppers abut at the pick off station. This bracket is adjustable vertically to accommodate stoppers of different vertical heights and again, to ensure correct positioning for engagement and pickup by the rotary pickup wheel 208.

There is illustration in FIGS. 20-22 inclusive, a further embodiment of pickup method, system and apparatus in accordance with the present invention. In this instance the stopper discharge station 330 terminates adjacent the periphery of the wheel and the outermost stopper S abuts a fixed stop adjacent the end of the discharge chute and a spring biased pickup finger 332 normally prevents release in a circumferential direction. The pickup finger as illustrated in FIG. 22 includes an X-shaped rail 336 and a thin plate member 338 spaced below the rail 336 having an arcuate pocket or cut out 340 which engages the stoppers S below the flange in the manner illustrated in FIGS. 20 and 21. Note the end of the discharge chute has a through opening 342 to permit passage of the X-shaped rail and the pickup finger 332. In this instance, the outermost stopper S in the line is engaged by a pickup finger 332 on the periphery of the workwheel. The spring biased finger 332 pivots outwardly to release the outermost stopper in line. Immediately upon release of the outermost stopper, the next one in line is moved to a finger engaging position automatically.

In accordance with another feature of the present invention, the orientor is characterized by novel features of construction and arrangement to deliver stoppers single line to the stopper feed and application station in a predetermined orientation. To this end, the stoppers S are placed, in random fashion, in a bowl 27 which is mounted for rotation in a housing including a fixed peripheral wall 26A extending upwardly from an annular wall 41C of the bowl 27. As the bowl rotates, the stoppers S move up a fixed inclined ramp 230 to an annular ring-like surface or ledge 41C of the bowl 27 defining a pathway for the stoppers S. The ledge 41C is slightly inclined toward the peripheral wall 26A to urge the stoppers S toward the wall by reason of the inclination of the ledge and centrifugal action.

A first deflector bar 232 overlies the pathway 41C and as illustrated in FIG. 15 is angularly disposed to deflect excess stoppers S in the manner shown by the arrow so that the stoppers are in a top face up or top face down position after passing through the deflector 232 as shown in FIG. 15. Downstream of the first deflector 232 is a second curved deflector 240 having a terminal end portion 234 which is spaced above the pathway 41C a distance slightly greater than the height H of a stopper to allow the stoppers S to pass under the deflector. The second deflector 240 is positioned relative to the inner edge of the pathway 41C so that only stoppers which are top face down will pass and those that are top face up will be deflected. Note that the curved deflector 240 is spaced slightly above the pathway surface 41C a distance slightly greater than the thickness of the enlarged top $S_t$ of the stopper to allow the edge of the top of a stopper S to engage under the deflector and remain on the pathway 41C in a top face down position. Stoppers S which are top face up engage the curved deflector and are deflected to the bowl 27. Note that the space between the inner edge of the pathway 41C and the deflector wall 240 in the region of the terminal deflector 234 is slightly less than the radius of the enlarged top $S_t$ of a stopper S to achieve the discharging action back into bowl 27 if the stopper is in a top side up position. The distance from the edge of pathway 41C and wall 240 at the deflector 234 is slightly greater than the radius of the plug portion $S_p$ of a stopper S so that the stoppers which are top side down remain on pathways 41C and pass under deflector 234.

While particular emobidments of the present invention have been illustrated and described herein, it is not intended to limit the invention and changes and modifications may be made therein within the scope of the following claims.

What is claimed is:

1. An orientor for orienting elements having a top side, and a bottom side of smaller cross section than the top side, said elements including a flange, said orientor comprising a central conically shaped rotatable bowl defining an open chamber for said elements where they are positioned in random fashion to a discharge station, a first trackway communicating with said chamber to direct said elements from said chamber to an annular surface of said bowl defining a pathway for said elements above said chamber wherein said elements are still disposed in random fashion, a first deflector means spaced above said annular surface a height slightly greater than the height of said elements to orient said elements so that they are oriented on said annular surface either top or bottom side down and a second deflector means downstream of said first deflector means positioned to narrow the path on said annular surface so that only said elements facing top side down can proceed along said path to said discharge station, said second deflector extends across said pathway to a point where the distance between the inner edge of said pathway and said second deflector is less than the diameter of said enlarged flanged portion of said element and is spaced above said pathway a predetermined distance slightly greater than the thickness of said flange whereby said stoppers oriented in a flange, or face down position continue along said pathway and said elements with a flange, or face up position are deflected back into said bowl.

2. An orientor as claimed in claim 1 wherein said second deflector has a terminal end portion extending across said pathway and spaced upwardly from said pathway a height slightly greater than the height of said stopper to permit properly oriented stoppers to pass thereunder in single file.

3. An orientor as claimed as in claim 1 wherein said pathway surface is inclined downwardly toward a fixed peripheral wall surrounding said bowl to normally urge said elements toward said second deflector.

* * * * *